United States Patent Office 3,720,655
Patented Mar. 13, 1973

3,720,655
FLUORINE-CONTAINING COPOLYMER COMPOSITIONS AND METHOD FOR THEIR PREPARATION
Swayambu Chandrasekaran, East Orange, and Max B. Mueller, Morristown, N.J., assignors to Allied Chemical Corporation, New York, N.Y.
No Drawing. Filed Sept. 27, 1971, Ser. No. 184,185
Int. Cl. C08f 15/04, 15/06
U.S. Cl. 260—87.5 B                3 Claims

ABSTRACT OF THE DISCLOSURE

About equimolar thermoplastic 3,3,3-trifluoro-2-trifluoromethyl propene/ethylene copolymers are prepared by copolymerizing the monomers in the presence of a free radical generating initiator. The copolymer products are melt-processable, resist attack by corrosive agents and solvents, can be formed into elastic fiber and are especially suitable for use in surface coatings having high water and oil repellency.

BACKGROUND OF THE INVENTION

The present invention relates to new and useful 3,3,3-trifluoro - 2 - trifluoromethyl propene/ethylene copolymers having good chemical inertness and good electrical properties, which are especially suitable for use in surface coatings, insulating material and elastic fibers.

Known fluorine-containing polymeric compositions include many which have found wide application by reason of their chemical inertness, good mechanical properties, and high thermal stability. There is always a need for new fluorine-containing polymeric compositions having improved properties.

It is an object of the present invention to provide melt-processable, thermoplastic, fluorine-containing 3,3,3-trifluoro - 2 - trifluoromethyl propene/ethylene copolymer compositions which, in combination, have good chemical inertness and good mechanical properties, which have a glass transition point near room temperature and which are suitable for use in high strength thermally stable coating compositions having high oil and water repellency, and for use as elastic fibers.

Other objects and advantages of the present invention will become apparent from the following disclosure.

BRIEF SUMMARY OF THE INVENTION

The present invention provides about equimolar copolymers of 3,3,3-trifluoro-2-trifluoromethyl propene with ethylene and a method for their preparation by copolymerizing 3,3,3-trifluoro-2-trifluoromethyl propene with ethylene in a liquid medium in the presence of a free radical generating polymerization initiator, as hereinafter described.

DETAILED DESCRIPTION

The 3,3,3-trifluoro-2-trifluoromethyl propene monomer starting material having the formula $(CF_3)_2C=CH_2$ may be prepared as described by Kauffman et al. in J. Org. Chem. 31, 3090 (1966). Briefly, it preparation involves refluxing hexafluoro-2-methyl-2-propanol with phosphorous pentachloride to obtain the desired 3,3,3-trifluoro-2-trifluoromethyl propene as non-condensed overhead product, together with concurrently formed hydrogen chloride. The hydrogen chloride can be removed from the crude overhead product by conventional techniques, such as by distillation or by scrubbing with alkaline media.

The ethylene monomer starting material is a commercially available product.

Copolymerization of these monomers is effected by contacting them in a suitable liquid polymerization medium in the presence of a free radical generating polymerization initiator.

Suitable liquid polymerization media include aqueous media as well as non-aqueous media, such as one or both of the liquid monomers, or non-polymerizable organic solvents, specifically those perfluorinated and perchlorofluorinated hydrocarbons containing up to about 10 carbon atoms which are liquid at the chosen polymerization temperature, and especially those perfluorinated and perchlorofluorinated alkanes of up to about 6 carbon atoms having melting points below about 80 C., and saturated perfluorocyclic ethers. A partial listing of organic solvents suitable for use as liquid polymerization media includes perfluorocyclobutane, pentachlorofluoroethane, 1,1,2-trichlorotrifluoroethane, 1,1,2,2 - tetrachloro - 1,2 - difluoroethane, 1,1,1,2 - tetrachlorodifluoroethane, octafluoropropane, perfluoro-n-butane, perfluoro-n-pentane, trichlorofluoromethane, dichlorofluoromethane, dichlorodifluoromethane, 1,2 - dichloro - 1,1,2,2 - tetrafluoroethane, and the like, the 3,3,3-trifluoro-2-trifluoromethyl propene monomer, 1,1,2 - trichlorotrifluoroethane and octafluorocyclobutane being most preferred.

Suitable free radical generating polymerization initiators include organic peroxy compounds such as the well-known aliphatic and aromatic peroxy compounds, including the fluorine and chlorine substituted organic peroxides, as for example, 2,4-dichlorobenzoyl peroxide, t-butylperoxypivalate, decanoyl peroxide, lauroyl peroxide, propionyl peroxide, acetyl peroxide, trifluoroacetyl peroxide, trichloroacetyl peroxide, perfluoropropionyl peroxide, succinic acid peroxide, t-butyl peroxyoctoate, benzoyl peroxide, and the like; peroxide esters such as di-iso-propyl peroxydicarbonate, and others. Although the above-described free radical initiating polymerization initiators are especially suitable for making the copolymers of the present invention by copolymerizing the monomers using as liquid reaction medium one or both of the monomers per se, or using organic solvents as above described, they may also be used for carrying out the copolymerization in aqueous media in the presence or absence of dispersing and/or suspending agents.

When the copolymerization is to be carried out in the presence of an aqueous medium, and, especially, in aqueous dispersion, there may additionally be used as free radical generating polymerization initiator water-soluble peroxides such as hydrogen peroxide, barium peroxide and sodium peroxide; persulfate, perphosphate and perborate salts of, e.g., sodium, potassium, calcium, barium and ammonium; and organic hydroperoxides such as cumene hydroperoxide or t-butyl hydroperoxide. These water-soluble free radical generating polymerization initiators may be used in conjunction with suitable reducing agents which act as catalyst activators, such as alkali metal bisulfites, alkali metal formaldehyde sulfoxylates, or sulfur dioxide. If desired, the above-described types of water-soluble free radical generating polymerization initiators may be used in conjunction with known accelerators therfor, such as silver salts, for example, silver nitrate or silver nitrite, ferrous sulfate, ferrous nitrate, and others.

Generally, the initiator will be employed in amount of about 0.003 to about 3 percent, usually about 0.02 to about 1 percent by weight, based on the monomer charge. The initiator may be added initially, or, in order to maintain desired polymerization rates, intermittently or continuously throughout the polymerization.

Although not ordinarily preferred, copolymerization may also be initiated or catalyzed by active radiation, as may, for example, be provided by ultraviolet light, γ-rays and the like.

When the copolymerization is carried out in an aqueous medium, then it is preferably carried out at temperatures at which the 3,3,3-trifluoro-2-trifluoromethyl propene, under prevailing pressures, will be present within the polymerization medium in liquid phase. Copolymerization of the monomers in aqueous media may be carried out in the presence or absence of well known buffering, suspending and dispersing agents.

The copolymerization reaction in aqueous media is preferably conducted at a pH within the range of about 2 to 10, preferably within about 5 to 8, employing suitable buffers such as the carbonates, bicarbonates, phosphates, hydrogen phosphates, etc. of the alkali metals, for example, sodium carbonate, sodium bicarbonate, disodium hydrogen phosphate, and potassium pyrophosphates, hydrogen phosphates, etc. of the alkali metals, or potassium tetraborate.

Dispersing agents suitable for use in carrying out the copolymerization in aqueous dispersion are those customarily employed in dispersion polymerization of polymerizable ethylenically unsaturated organic compounds, such as alkali metal soaps of higher fatty acids, such as potassium, ammonium or sodium myristate, laurate, palmitate, oleate or stearate; the alkali metal or ammonium alkyl or alkylene sulfates or sulfonates, such as, e.g., sodium and/or potassium lauryl or decyl sulfate, cetyl and stearyl sulfonate; but especially the well known polyfluorinated carboxylic acid dispersing agents, such as perfluorooctanoic acid, and their alkali metal and ammonium salts, and the polyfluorinated sulfonic acids such as perfluoroalkyl sulfonic acids and their alkali metal and ammonium salts. Use of polyfluorinated dispersing agents is preferred.

The suspending and dispersing agents, if used, may be employed within wide ranges of concentration, but are ordinarily employed in amounts ranging from 0.05 to 5, preferably in amounts ranging from 0.1 to about 2 percent by weight, based on the weight of the aqueous medium.

Polymerization temperatures and pressure are not critical. The copolymerization may be carried out at temperatures within the range of about $-80°$ C. to about $300°$ C., is preferably carried out at temperatures in the range of $-20°$ to about $100°$ C., and, more preferably, yet, at temperatures within the range of about $-15°$ C. to about $80°$ C. When the copolymerization is to be conducted in an aqueous medium, then, of course, the polymerization temperature may not be lower than about $0°$ C. In an event, copolymerization in accordance with the present invention is carried out at temperatures above those at which the liquid polymerization medium employed will solidify, and the choice of copolymerization temperature will largely be governed by the desired decomposition rate at a given temperature of the particular initiator system employed. The copolymerization may be carried out at any desired pressure, but it is ordinarily conducted at pressures ranging from about atmospheric to about 500 p.s.i.g. For reasons of economy in equipment design, the copolymerization is preferably carried out at pressures below about 200 p.s.i.g. While, ordinarily, the copolymerization will be conducted under autogenous pressure as it may prevail under chosen polymerization conditions, it may also be conducted under superimposed pressures, as obtained by charging the polymerization zone with a gas, such as, e.g., nitrogen.

If desired, the molecular weight of the copolymer product may be varied or controlled by inclusion in the polymerization recipe of one or more of the well known chain transfer agents or chain transfer solvents.

Recovery of the copolymer product from the polymerization medium follows conventional procedure. When the reaction is carried out in 3,3,3-trifluoro-2-trifluoromethyl propene as liquid reaction medium, or in organic solvents as hereinabove defined, or in aqueous suspension, then the copolymer product is generally obtained as a white granular powder which can be readily separated from the reaction medium by conventional methods, such as gassing off the excess monomers and low boiling solvents, under reduced pressure and/or elevated temperature, if desired, or by filtration from the aqueous medium or higher boiling solvents. When the copolymerization is carried out in aqueous dispersion, then the copolymer product is generally obtained as a latex and may be recovered in conventional manner by first coagulating the latex, and then separating the coagulated product by filtration. Coagulation of the latex may be affected by methods well known to those skilled in the art, for example, by addition of electrolytes, by agitation, sonic vibration, and the like. In any event, the copolymer product after separation from the reaction medium is ordinarily washed with suitable solvents, as, e.g., methanol, to remove catalyst residues.

While neither of the monomers employed for making the copolymers of the present invention is capable of homopolymerization under the above-described process conditions, they readily copolymerize with each other to form about equimolar 3,3,3-trifluoro-2-trifluoromethyl propene/ethylene copolymers containing the respective monomers in amount ranging between about 45 to 55 mol percent, irrespective of the composition of the monomer feed. While the copolymers of the present invention are not highly crystalline, X-ray diffraction shows that there is some degree of crystallinity even in quenched samples. These polymers melt at about 135 to $140°$ C. and have a glass transition temperature of about $30°$ C. These copolymers do not dissolve in common organic solvents. They have been found soluble in hexafluorobenzene at $80°$ C.

The following examples illustrate preferred embodiments of the present invention and set forth the best mode contemplated for its practice.

EXAMPLE 1

A glass reactor of 100 ml. capacity equipped with magnetic stirrer was evacuated, purged with dry nitrogen gas and charged with 0.08 gram of trichloroacetyl peroxide, 27 grams 3,3,3 - trifluoro - 2 - trifluoromethylpropene, 50 grams perfluorocyclobutane and 4.7 grams ethylene, the monomers being charged in 50/50 mol ratio. Polymerization was allowed to proceed under constant stirring at $-12°$ C. for a period of 26 hours. A fair amount of polymer was visually observed after about 2 hours polymerization time. At the end of the 26 hour period, a large amount of solid white polymer was seen inside the reactor. The reactor was vented, evacuated and purged with nitrogen. Solid reactor contents were stirred in methanol, filtered and washed with small portions of methanol. The white copolymer product thus obtained was dried at $100°$ C. at 29″ Hg vacuum. The product had a DSC (differential scanning calorometer) melting point of $140°$ C. and contained 48 mol percent ethylene, based on carbon analysis. A 100 milligram sample of this product dissolved completely in 2 milliliters of hexafluorobenzene upon heating at $80°$ C. for one hour.

EXAMPLES 2–6

The procedure of Example 1 was repeated, but varying the mol percent of ethylene monomer present in the monomer feed from 15 percent to 70 percent. Molar composition of the copolymer product and its melting point are shown in Table 1 below.

TABLE 1.—EFFECT OF MONOMER FEED COMPOSITION ON COPOLYMER COMPOSITION

| Mole percent ethylene in feed | Mole percent ethylene in copolymer [1] | Melting temp. (° C.) [2] |
|---|---|---|
| 15 | 47.9 | 135 |
| 40 | 48.8 | 130 |
| 45 | 49.2 | 135 |
| 50 | 48.1 | 140 |
| 70 | 49.7 | 140 |

[1] Based on carbon analysis.
[2] Measured on Fisher-Johns melting point apparatus.

Copolymers of the present invention are eminently suitable for making a wide variety of useful products such as film sheets, solid objects, coatings, fibers, filaments and the like. These products are especially suited for use and application where their resistance to attack by solvents and chemical agents, their good electrical insulating properties and their water and oil repellency may be used to advantage. Drops of oil or water placed on the surface of the polymer do not wet the polymer, but remain in droplet form and are readily removed. Fibers drawn from the melt of the polymer exhibit elastic characteristics. The copolymers of the present invention are melt processable, hence can be fabricated readily in conventional manner by extrusion, calendering, molding and the like.

The good properties of the copolymers of the present invention may, for certain purposes, if desired, be improved by incorporating therein inert fillers such as asbestos, glass, metal powders, diamond powder, abrasive powders, graphite, cork, flour and the like. Such fillers generally may be incorporated for the purpose of improving such properties as resistance to creeping under load, resistance to wear by rotating shafts, stiffness, thermal conductivity, electrical insulating properties and hardness. If desired, fillers may also be incorporated for a variety of other purposes, as, for example, pigmentation, lubrication or cost reduction.

Since various changes and modifications may be made in the invention without departing from the spirit and essential characteristics thereof, it is intended that all matter contained in the above description shall be interpreted as illustrative only, the invention being limited only by the scope of the appended claims.

We claim:

1. A normally solid about equimolar copolymer of 3,3,3-trifluoro-2-trifluoromethyl propene and ethylene.

2. A copolymer according to claim 1 containing from about 45 to about 55 mol percent of 3,3,3-trifluoro-2-trifluoromethyl propene and correspondingly of from about 55 to about 45 mol percent of ethylene.

3. A copolymer according to claim 1 containing a filler.

References Cited

UNITED STATES PATENTS 3,240,757   3/1966   Sterling _____ 260—87.5 A

HARRY WONG, JR., Primary Examiner

U.S. Cl. X.R.

204—159.22; 260—29.6 F, 41 R, 41 A, 41 B, 41 C, 41 AG, 92.1